June 20, 1944. M. SHOELD Re. 22,500
PROCESS OF MANUFACTURING ANIMAL FEED COMPOSITIONS
Original Filed May 16, 1942
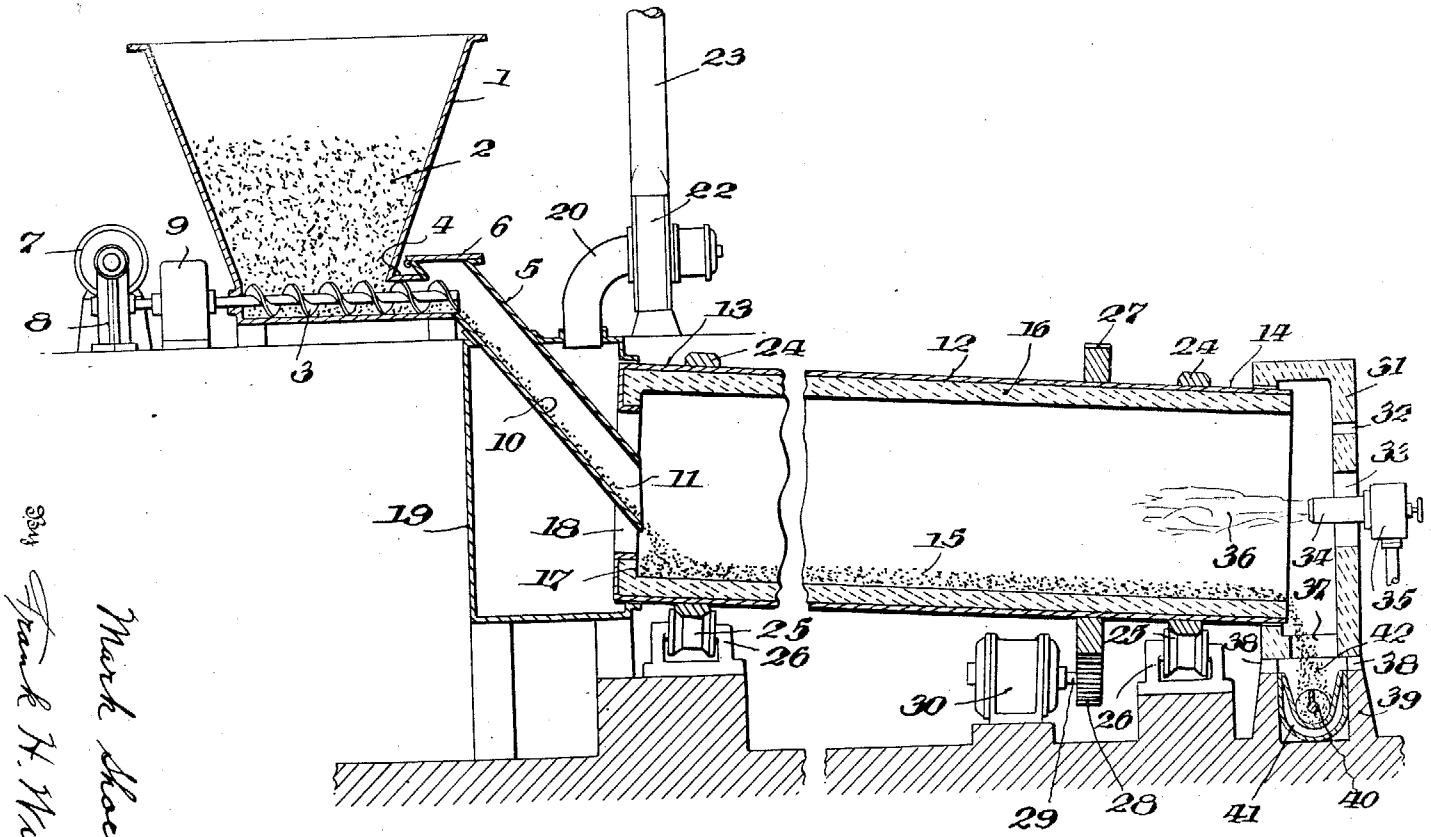
Inventor
Mark Shoeld.
By Frank H. Wisch.
Attorney Reissued June 20, 1944

Re. 22,500

UNITED STATES PATENT OFFICE 22,500

PROCESS OF MANUFACTURING ANIMAL FEED COMPOSITIONS

Mark Shoeld, Towson, Md., assignor to The Davison Chemical Corporation, a corporation of Maryland Original No. 2,328,884, dated September 7, 1943, Serial No. 443,257, May 16, 1942. Application for reissue November 3, 1943, Serial No. 508,870

9 Claims. (Cl. 99—2)

This invention relates to improvements in the manufacture of a mineral supplement for animal feed.

In Patent No. 2,234,511, dated March 11, 1941, a process is disclosed in which superphosphate is calcined at temperatures of 600° C. to 800° C. to remove fluorine therefrom and to provide a calcium and phosphorus-containing material available for animal feed.

It is found in the process of the present invention that an improved, nontoxic product is obtained by calcining superphosphate at temperatures at which sulphuric acid, originally combined with calcium as calcium sulphate, is driven off. This is accomplished without fusion or volatilization of the available $P_2O_5$ in the superphosphate, and at temperatures above 800° C. Temperatures below fusion temperatures and in the range of 800° C. to substantially 1200 or 1250° C. are preferably employed. Particularly good results are obtained at around 1200° C. or slightly above.

Sulphate ordinarily present in superphosphate has no food value. By calcination of superphosphate at temperatures above 800° C. the calcium and phosphorus of a given batch treated are retained to the extent of substantially their original contents and in completely available form. As indicated in the reaction represented by the following equation all of the calcium and phosphorus remains in the product and in a highly beneficial ratio:

$$CaH_4(PO_4)_2+2CaSO_4 \rightarrow Ca_3(PO_4)_2+2H_2O+O_2+2SO_2$$

Either ordinary den superphosphate or the granular superphosphate of commerce may be employed in the present process. The granular superphosphate is a product comprising nodular, globoid granules which have indurated and encrusted surfaces and which have a crushing strength several times that of fully cured den superphosphate. At the higher temperatures employed in the present process, the granular superphosphate retains certain desirable properties which render it more advantageous for use than the ordinary den superphosphate. As found at lower temperatures, so also at the higher temperatures, more even heating can be obtained, a more even contact of the heating medium with the surfaces presented by the granules is made possible, and there is practically no loss due to dust formation.

A means by which the present process is conducted economically and by which an excellent uniform final product is prepared is an inclined rotary kiln into which superphosphate is fed at the high end and is tumbled and passed towards the low discharge end. A burner is provided at the lower end of the kiln and hot gases are drawn through the kiln by means of an exhaust fan. The gases heat the tumbled phosphatic material and calcine it to a point at which not only fluorine is removed, but also sulphur existing as sulphate.

The single figure in the accompanying drawing represents a longitudinal section of an apparatus suitable for carrying out the present process.

In the drawing, numeral 1 designates a hopper to which is fed superphosphate by means of a clam shell bucket or other suitable means, not shown. The hopper 1 is shown partially loaded with superphosphate, as indicated at 2. In the bottom of the hopper 1 lies a screw conveyor 3, which is adapted to discharge superphosphate through an outlet 4 into a chute 5. The chute 5 is closed by means of a hinged door 6.

The feed screw 3 is adapted to be driven by means of a motor 7 which, through a reduction gearing 8, drives a variable speed transmission 9. At 10 in the chute 5 is shown superphosphate which passes down the chute 5 and through a discharge end 11 of the chute 5 into a rotary calciner indicated generally by the numeral 12. The rotary calciner has its axis at a slant to the horizontal, having a high end 13 into which the superphosphate to be calcined is delivered, and a lower end 14 from which the calcined superphosphate is discharged. The superphosphate passing through the rotary calciner 12 is indicated by the numeral 15.

The rotary calciner 12 is provided with a refractory lining 16. The upper end of the rotary calciner 12 is constricted, as indicated at 17, and the chute 5 delivers the superphosphate to be calcined through a constricted opening 18 formed at the upper end of the calciner.

Adapted to fit around the upper end of the calciner 12 is an exhaust breeching 19 which, at its upper end is in communication with an exhaust pipe 20 that is connected to an exhaust fan 22. The exhaust fan 22 delivers all exhaust gases through a stack 23.

In order to rotate the calciner 12, rings 24 are provided which are adapted to travel in rollers 25 mounted on supports 26. Motive power to move the calciner 12 and give it the desired rotary motion is furnished through a ring gear 27 driven by a pinion 28 which is mounted on a shaft 29 of a motor 30. There may be reduction gearing between the motor 30 and the pinion 28 if desired.

A refractory lined breeching 31 is shown at the lower end 14 of the rotary calciner 12. This refractory lined breeching is provided with a peek hole 32 through which the contents of the calciner may be viewed, and an aperture 33 through which projects a nozzle 34 of a gas or oil burner 35. At 36 is shown the flame of the burner. The temperature of the material in the calciner is maintained above 800° C.

Secondary air is inducted into the calciner through the aperture 33 and through a discharge opening 37 formed at the lower end of the refractory breeching 31. Air passes into the opening 37 through apertures 38 formed in a support 39 which carries a screw conveyor 40. The air which passes in through the aperture 33 and through apertures 38 and 37 may be in excess of that required for complete combustion of the fuel, but the moving gases are maintained at a high temperature to reduce the sulphate as well as the fluorine content of the superphosphate being treated.

The feed screw 40 is adapted to rotate in the bottom of a water-jacketed trough 41 into which falls the calcined superphosphate from the kiln. The calcined superphosphate 42 is partially cooled by the passage of the air through the apertures 38 and 37. From the water-jacketed trough 41 the finished material is discharged to storage.

Typical examples of analyses of the phosphatic material before and after calcination are as follows:

| | Before | After |
|---|---|---|
| | *Per cent* | *Per cent* |
| Total $P_2O_5$ | 21.5 | 34.3 |
| $SO_4$ | 34.5 | 5.3 |
| Fluorine | 1.4 | 0.02 |

As seen in the above tabulation, not only is the total $P_2O_5$ considerably increased by calcination above 800° C., and the fluorine practically completely eliminated, but the $SO_4$ is reduced by 90 per cent of the original $SO_4$ content. The superphosphate can be readily completely freed of a major portion of its original $SO_4$ content and substantially completely or to the extent of over 90 per cent thereof. This 90 per cent removal is calculated on the basis of an initial 100 pound sample of superphosphate. The $P_2O_5$, not being volatilized, its proportion in per cent may serve as a reference point. The calcined superphosphate runs 5.3 per cent $SO_4$ and 34.3 per cent $P_2O_5$, and if no $SO_4$ were driven off, 34.3 per cent $P_2O_5$ would correspond to 55 per cent $SO_4$. On this basis the ratio of 5.3 to 55 indicates the proportion of $SO_4$ left in the above sample after calcination, namely, approximately 9.6%. The proportion of $SO_4$ driven off would then be approximately 90.4%.

The product on cooling to atmospheric temperatures is in excellent physical condition and is readily reducible in particle size to the finer meshes. In the usual analytical methods employed in the trade and in feed tests the phosphate and calcium are found to be completely available. In a method in which digestability is measured by the proportion of a one gram sample found to dissolve in 100 c. c. of a 0.4 per cent solution of HCl in water at 65° C. in one hour, the total $P_2O_5$ in the product obtained by the present process is completely soluble. The ratio of calcium to phosphorus in the product is generally found to be substantially 1:0.43 or 1:0.44 which, as indicated above, is very favorable for feed purposes.

What is claimed is:

1. In a process of manufacturing animal feed from superphosphates, the step of calcining superphosphate at temperatures above 800° C. to substantially 1200° C. to remove sulphur originally chemically combined as sulphate in the superphosphate and to increase the availability for animal feed of the calcium and phosphorus contents.

2. In a process of manufacturing animal feed from superphosphates, calcining the superphosphate at temperatures above 800° C. to substantially 1200° C. until a major portion of sulphur originally chemically combined as sulphate in the superphosphate is substantially completely eliminated from the superphosphate.

3. In a process of manufacturing animal feed from superphosphates, the step consisting of calcining superphosphate in the form of nodular, globoid granules which have indurated and encrusted surfaces, at temperatures above 800° C. to substantially 1200° C. until a major portion of sulphur originally chemically combined as sulphate in the superphosphate is substantially completely eliminated from the superphosphate.

4. In a process of manufacturing animal feed from superphosphates, the step of calcining superphosphate, without fusion, at temperatures above 800° C. until a major portion of sulphur originally chemically combined as sulphate in the superphosphate is substantially completely eliminated from the superphosphate.

5. In a process of manufacturing animal feed from superphosphates, the step of calcining superphosphate, without fusion of the superphosphate and volatilization of the $P_2O_5$ content of the superphosphate, at temperatures above 800° C. until a major portion of sulphur originally chemically combined as sulphate in the superphosphate is substantially completely eliminated from the superphosphate.

6. In a process of manufacturing animal feed from superphosphates, the step of calcining superphosphate at temperatures within a range of 1200° to 1250° C. until a major portion of sulphur originally chemically combined as sulphate in the superphosphate is substantially completely eliminated from the superphosphate.

7. In a process of manufacturing animal feed from superphosphates, the step of calcining superphosphate at substantially 1200° C. until a major portion of sulphur originally chemically combined as sulphate in the superphosphate is substantially completely eliminated from the superphosphate.

8. In a process of manufacturing animal feed from superphosphates, the step of calcining superphosphate in the form of nodular, globoid granules which have indurated and encrusted surfaces, without fusion of the superphosphate and volatilization of the $P_2O_5$ content of the superphosphate, at temperatures above 800° C. until a major portion of sulphur originally chemically combined as sulphate in the superphosphate is substantially completely eliminated from the superphosphate.

9. In a process of manufacturing animal feed from superphosphates, the step of calcining superphosphate at temperatures above 800° C. and below the temperature of volatilization of the $P_2O_5$ content of the superphosphate to remove sulphur originally chemically combined as sulphate in the superphosphate and to increase the availability for animal feed of the calcium and phosphorus contents.

MARK SHOELD.